(12) United States Patent
Nixon et al.

(10) Patent No.: US 7,392,165 B2
(45) Date of Patent: Jun. 24, 2008

(54) SIMULATION SYSTEM FOR MULTI-NODE PROCESS CONTROL SYSTEMS

(75) Inventors: Mark Nixon, Round Rock, TX (US); Terrence Blevins, Round Rock, TX (US); Dennis Stevenson, Round Rock, TX (US); Michael Lucas, Leicester (GB)

(73) Assignee: Fisher-Rosemount Systems, Inc., Austin, TX (US)

( * ) Notice: Subject to any disclaimer, the term of this patent is extended or adjusted under 35 U.S.C. 154(b) by 614 days.

(21) Appl. No.: 10/274,562

(22) Filed: Oct. 21, 2002

(65) Prior Publication Data

US 2004/0078182 A1    Apr. 22, 2004

(51) Int. Cl.
*G48G 7/48* (2006.01)
(52) U.S. Cl. .................... 703/7; 703/6; 700/19; 700/51; 700/80; 700/90
(58) Field of Classification Search .................. 703/7; 700/90, 19, 51, 80
See application file for complete search history.

(56) References Cited

U.S. PATENT DOCUMENTS

| 5,826,060 | A | 10/1998 | Santoline et al. |
| 6,446,202 | B1 * | 9/2002 | Krivoshein et al. .............. 713/1 |
| 6,742,136 | B2 * | 5/2004 | Christensen et al. ............ 714/5 |
| 6,760,687 | B2 * | 7/2004 | Apel et al. ................... 702/187 |
| 6,774,786 | B1 * | 8/2004 | Havekost et al. ............. 340/517 |
| 6,871,299 | B2 * | 3/2005 | Havekost et al. .............. 714/47 |
| 2002/0163427 | A1 * | 11/2002 | Eryurek et al. .............. 340/500 |
| 2003/0115037 | A1 * | 6/2003 | Sumida ........................ 703/22 |
| 2004/0116127 | A1 * | 6/2004 | Marinier et al. ............. 455/450 |
| 2005/0007249 | A1 * | 1/2005 | Eryurek et al. .............. 340/511 |

FOREIGN PATENT DOCUMENTS

GB    2 349 958 A    11/2000

OTHER PUBLICATIONS

Examination Report under Section 18(3) in British Application No. GB 0324469.6, dated Sep. 9, 2005.

* cited by examiner

*Primary Examiner*—Paul Rodriguez
*Assistant Examiner*—Andre Pierre-Louis
(74) *Attorney, Agent, or Firm*—Marshall, Gerstein & Borun LLP (57) ABSTRACT

A simulation system attaches to a configuration database for one or more fully configured nodes of a process control system and copies the modules within those nodes into one or more simulation computers as simulation modules. The simulation system includes an algorithm that automatically creates a reference parameter module for each of the copied nodes that stores a reference parameter for each of the inputs, outputs or other references to signals external to the nodes. In the case of the Fieldbus function blocks, the simulation system automatically creates a function block within the simulation workstation in the protocol of the controller node which mimics the operation of the Fieldbus function block, and then creates the simulation system having those mimicked Fieldbus function blocks operating as if they had originally been configured to be in the controller being simulated, instead of within a field device external to the controller.

30 Claims, 8 Drawing Sheets

SIMULATION SYSTEM FOR MULTI-NODE PROCESS CONTROL SYSTEMS

FIELD OF TECHNOLOGY

The present invention relates generally to process control systems and, more particularly, to a simulation system that simulates one or more nodes of a multi-node process control system to provide simulated process control functionality associated with a distributed process control system.

DESCRIPTION OF THE RELATED ART

Distributed process control systems, like those used in chemical, petroleum or other processes, typically include one or more process controllers communicatively coupled to one or more field devices via analog, digital or combined analog/digital buses. The field devices, which may be, for example, valves, valve positioners, switches and transmitters (e.g., temperature, pressure and flow rate sensors), are located within the process environment and perform process functions such as opening or closing valves, measuring process parameters, etc. Smart field devices, such as the field devices conforming to the well-known Fieldbus protocol may also perform control calculations, alarming functions, and other control functions commonly implemented within the controller. The process controllers, which are also typically located within the plant environment, receive signals indicative of process measurements made by the field devices and/or other information pertaining to the field devices and execute a controller application that runs, for example, different control modules which make process control decisions, generate control signals based on the received information and coordinate with the control modules or blocks being performed in the field devices, such as HART and Fieldbus field devices. The control modules in the controller send the control signals over the communication lines to the field devices to thereby control the operation of the process.

Information from the field devices and the controller is usually made available over a data highway to one or more other hardware devices, such as operator workstations, personal computers, data historians, report generators, centralized databases, etc., typically placed in control rooms or other locations away from the harsher plant environment. These hardware devices run applications that may, for example, enable an operator to perform functions with respect to the process, such as changing settings of the process control routine, modifying the operation of the control modules within the controller or the field devices, viewing the current state of the process, simulating the operation of the process for the purpose of training personnel or testing the process control software, keeping and updating a configuration database, etc.

As an example, the DeltaV™ control system, sold by Fisher-Rosemount Systems, Inc. includes multiple applications stored within and executed by different devices located at diverse places within a process plant. A configuration application, which resides in one or more operator workstations, enables users to create or change process control modules and download these process control modules via a data highway to dedicated distributed controllers. The configuration application may also allow a designer to create or change user interfaces which are used by a viewing application to display data to a user and to enable a user to change settings, such as set points, within the process control routine. Each dedicated controller and, in some cases, field devices, store and execute a controller application that runs the control modules assigned and downloaded thereto to implement actual process control. Viewing applications, which may be run on one or more operator workstations, receive data from the controller application via the data highway and display this data to process control system designers, operators, or users using the user interfaces, which may provide any of a number of different views, such as an operator's view, an engineer's view, a technician's view, etc. A data historian application is typically stored in and executed by a data historian device that collects and stores some or all of the data provided across the data highway while a configuration database application may run in a still further computer device attached to the data highway to store the current process control routine configuration and data associated therewith. Alternatively, the configuration database is stored in the same workstation as the configuration application.

Simulation applications, such as the Mimic application sold by Don H. Munger Company in St. Louis, Mo., or the HYSYS application manufactured and sold by Hyprotech in Calgary Canada may be run on a personal computer attached to the data highway. These or other interface applications communicate with the controller application and the viewing application via the data highway to enable testing of the control modules stored in the controller or the user interfaces. These simulation applications also enable training and system checkout to be preformed. In some cases, the HYSYS application, which is a high fidelity process simulation product, has been integrated into the same computer as the Mimic application to simulate the exact timing and response of a process control design for the checkout of that design. Typically, these simulation applications communicate with the controller applications within the controller or the field devices using a standard interface, such as the OPC interface or the PI interface, which are well-known.

Alternatively, simulation has been performed manually, wherein an operator or other user takes advantage of the simulate capabilities of input/output (I/O) function blocks within the control modules of the controller or the field devices to manually set the value and status variables processed by the I/O blocks to, in turn, enable information or control logic to be verified without actually controlling a field device or even having a field device connected to the controller. In either case, specific simulation modules may be created and stored in the controller or the field devices to interact with the actual control modules by providing simulated process dynamics based on an output block target to the actual control modules.

In these systems, it is possible to verify that the information shown in the user displays produced by the viewing applications is being correctly communicated by the controller after designing, assigning and downloading the control modules to the controller or the field devices and using a simulation procedure to test the system. Using the complete system hardware for configuration checkout and operator training is typically performed prior to set up of the controller system so that the physical connections to the controller and communications between the controller and workstation may be fully tested. Also, the performance, memory requirements, and loads introduced into the controller by configured modules may be examined.

However, in many cases, it is desirable to simulate a process control system, or a node of a process control system, after that process control system has been fully configured and implemented and/or while the process control system is operating on-line. For example, it may be desirable to create a simulation environment that mimics a fully implemented process control system for training purposes, such as to train new operators, or for testing purposes, such as to test a new set of operating parameters to see if desired results are obtained prior to running the actual plant with those operating parameters.

Unfortunately, if a simulation system was not created at the time the configuration was implemented, a configuration system must be created from the actual process, as configured. This typically means that an operator or other person must manually create a simulation system by installing a separate simulation block for each of the control blocks within each of the nodes to be simulated and must create an I/O block or reference for each block or function outside of the node being simulated, but communicatively connected to those nodes. The operator must also configure the communications between these blocks to mimic the actual communications occurring within the process plant. Because the operator is manually copying each node, on a block by block basis, the created simulation system may include operator introduced errors and thus may not accurately simulate the plant as configured. Furthermore, this process is very time consuming, especially in complex plants which may have hundreds or thousands of different blocks in each node, requiring the creation of hundreds or thousands simulation control blocks and sometimes even more input/output blocks.

Alternatively, the operator may copy the software, as configured, for each of the blocks of a node into a simulation environment, such as onto a simulation computer. However, in this case, the operator must still manually create the simulation input/output blocks or references to those blocks. As noted above, this process is still fraught with operator introduced errors and is time consuming.

In any event, because of the problems noted above, the creation of a simulation system for an actual operating and configured plant takes a good deal of time and operator manpower and, therefore, is very costly, sometimes costing millions of dollars. This cost deters many plants from creating accurate simulation systems for the process control system as configured, which limits the amount and quality of training that can be provided at the plant as well as the amount of off-line testing that can be performed.

Furthermore, there are many signals, such as status signals of the input/output blocks that cause problems within a simulation system copied from an actual operating system. In particular, each block, when sending a communication signal to another block, generally provides a status signal indicating the status of the signal as, for example, good, bad, stale, etc. However, in the simulation environment copied from the operating plant, the status signals will always be old or bad because there is no actual device within the plant sending and updating that signal. As a result, the simulation system may become bogged down in dealing with bad status signals and be unable to simulate the actual control environment or may send numerous error messages to the operator which becomes tedious to the simulation operator.

Still further, there are situations or times in which it is desirable to catch or create a snapshot of the simulation system that is running, including the values of all the process variables, set points and other process parameters. This snapshot of the simulated plant or a node of the plant may be useful in diagnosing a problem, saving a particularly good or bad plant condition for later use in another simulation, to repeat the same simulation and test the effect of different actions, etc. However, currently, there is no known manner of creating a snapshot of a simulation at a particular instance without actually halting the operation of the simulation for a significant period of time and coping the status of each of the blocks within the simulation. Because known or standard methods of copying the blocks, etc. in a node take longer than the operating cycle of the node, performing these copying methods on an operating simulation would mean that variables or values would change during the copying process and, thus, the captured plant or node status would not be for a particular single instance in time but would, instead, have different variable values from different times. On the other hand, halting the simulation for the amount of time it takes to access and copy the values of all of the module parameters, especially in an object oriented programming environment is noticeable to the simulation operator and may be disruptive.

SUMMARY

A simulation system attaches to a configuration database for one or more fully configured nodes of a process control system and copies the modules, including the function blocks, within those nodes into one or more simulation computers. The simulation system includes an algorithm that, during or after the copying process, automatically creates a reference parameter module for each of the copied nodes to store a reference parameter for each of the input or output references external to the node, such as input/output blocks, other function blocks in other nodes, transmitter blocks in field devices, etc. In the case of Fieldbus function blocks, the simulation system automatically creates a function block within the simulation workstation in the protocol of the controller node which mimics the operation of the Fieldbus function block, and then creates the simulation system having those mimicked Fieldbus function blocks operating as if they had originally been configured to be in the controller being simulated, instead of within a field device external to the controller. Still further, the simulation system may disable the status signals or operate in a manner that ignores the status signals of the created input/output blocks within the simulation system to prevent the status signals from causing operator visible errors.

Furthermore, the redundant capabilities of known control modules may be used to catch or store a snapshot of a simulation system in a very short period of time. In particular, the simulation system may use the redundant outputs provided by each of the control blocks within the process control system and, instead of updating a redundant blocks, simply store the updated parameters in a logical manner in a memory within the simulation workstation. When a snapshot of a simulation node is desired, the simulation system may halt the operation of the simulation modules for the amount of time that it takes to copy the redundant data within the simulation memory into a snapshot file or a buffer file of some sort. After this copying process, which is very quick, the simulation system can be restarted. Often, the copying process is so short that the simulation operator notices no disruption in the operation of the simulation system. This process enables a simulation operator to obtain a snapshot of one or more simulation nodes at a particular and single instance in time without having to seriously disrupt the simulation system.

DESCRIPTION OF THE PREFERRED EMBODIMENTS

Figure 1:
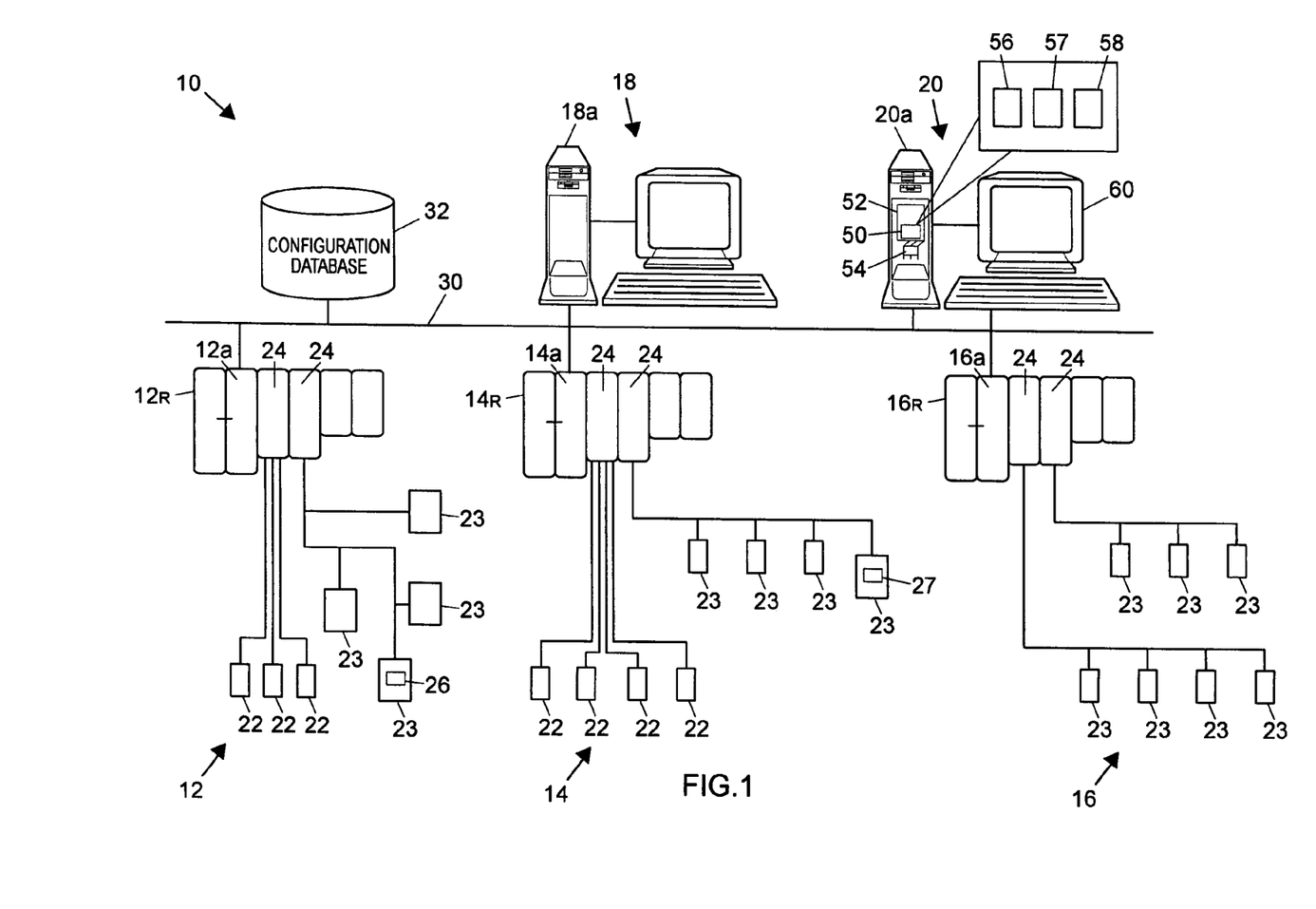
FIG. 1 is a block diagram of a typical process control network having multiple nodes and a simulation system for creating and executing a simulation of one or more of the nodes.

Referring now to FIG. 1, a distributed process control system 10 includes one or more nodes 12, 14, 16, 18 and 20. In the example process control system 10 of FIG. 1, each of the nodes 12, 14 and 16 includes a process controller 12a, 14a, 16a connected to one or more field devices 22 and 23 via input/output (I/O) devices 24 which may be, for example, Fieldbus interfaces, HART interfaces, etc. The controllers 12a, 14a and 16a are also coupled to one or more host or operator workstations 18a and 20a in the nodes 18 and 20 via a data highway 30 which may be, for example, an Ethernet link. If desired, the controller nodes 12, 14 and 16 may include redundant controllers 12R, 14R and 16R which are provided to track the status of the controllers 12a, 14a and 16a in known manners (i.e., typically using dedicated communication links) and to take over as the primary controllers upon failure of the associated ones of the primary controllers 12a, 14a and 16a. While the controller nodes 12, 14, 16 and the input/output and field devices 22, 23 and 24 associated therewith are typically located down within and distributed throughout the sometimes harsh plant environment, the operator workstation nodes 18 and 20 are usually located in control rooms or other less harsh environments easily assessable by controller personnel.

Generally speaking, the workstations 18a and 20a of the nodes 18 and 20 may be used to store and execute applications used to configure and monitor the process control system 10. Furthermore, a database 32 may be connected to the data highway 30 and operate as a data historian or a configuration database that stores the current configuration of the process control system 10 as downloaded to and stored within the nodes 12, 14, 16, 18 and 20.

As is known, each of the controllers 12a, 14a and 16a, which may be by way of example, the DeltaV controller sold by Fisher-Rosemount Systems, Inc., stores and executes a controller application that implements a control strategy using a number of different, independently executed, control modules or blocks. The control modules may each be made up of what are commonly referred to as function blocks wherein each function block is a part or a subroutine of an overall control routine and operates in conjunction with other function blocks (via communications called links) to implement process control loops within the process control system 10. As is well known, function blocks typically perform one of an input function, such as that associated with a transmitter, a sensor or other process parameter measurement device, a control function, such as that associated with a control routine that performs PID, fuzzy logic, etc. control, or an output function which controls the operation of some device, such as a valve, to perform some physical function within the process control system 10. Of course hybrid and other types of function blocks exist. While the Fieldbus protocol and the DeltaV system protocol use control modules and function blocks designed and implemented in an object oriented programming protocol, the control modules could be designed using any desired control programming scheme including, for example, sequential function block, ladder logic, etc. and are not limited to being designed using function block or any other particular programming technique. As is typical, the configuration of the control modules as stored within the process control nodes 12, 14 and 16 is stored in the configuration database 32 which is accessible to applications within the workstations 18a and 20a.

In the system illustrated in FIG. 1, the field devices 22 and 23 connected to the controllers 12a, 14a and 16a may be standard 4-20 ma devices, or may be smart field devices, such as HART, Profibus, or Fieldbus field devices, which include a processor and a memory. Some of these devices, such as Fieldbus field devices (labeled with reference number 23 in FIG. 1), may store and execute modules, or sub-modules, such as function blocks, associated with the control strategy implemented in the controllers 12a, 14a and 16a. Function blocks 26 and 27 are illustrated in FIG. 1 as being disposed in two different ones of the Fieldbus field devices 23. The function blocks 26 and 27 within the field devices 23 may be executed in conjunction with the execution of the modules within the controllers 12a, 14a and 16a to implement process control as is known. Of course, the field devices 22, 23 may be any types of devices, such as sensors, valves, transmitters, positioners, etc. and the I/O devices 24 may be any types of I/O devices conforming to any desired communication or controller protocol such as HART, Fieldbus, Profibus, etc.

In the process control system 10 of FIG. 1, the workstation 20a includes a simulation system or application 50 which is used to create and implement one or more simulations, referred to herein as simulation instances, for one or more nodes of the process control system 10. Generally speaking, when implemented, the simulation application 50 creates a simulation instance for one or more specified nodes by copying each of the control modules within the nodes from the configuration database as simulation modules and stores these simulation modules within the simulation workstation 20a. If desired, the simulation application 50 could distribute the simulation instance on multiple workstations if desired. However, for the purposes of this discussion, it will be assumed that all of the simulation modules are created on and executed on a single simulation workstation 20a. During this creation process, the simulation application 50 creates a reference parameter module for each of the nodes in the simulation instance, wherein each reference parameter module includes reference parameters for each of the input/output references associated with signals being sent into and out of the specified node by any of the simulation modules within that node. Once a simulation instance is created for a node or for multiple nodes, the simulation instance may be implemented and run for any desired purpose, such as for testing or training purposes.

As illustrated in FIG. 1, the simulation application 50 (which is stored in a computer readable memory 52 of and is adapted to be implemented on a microprocessor 54 of the host workstation 20a) includes applications, routines or subroutines 56-58 therein. The first routine 56 is associated with creating and operating a user display device 60 associated with the simulation workstation 20a to enable a simulation operator to create, view and control simulation instances of one or more nodes of the process control system 10. The second routine 57, when executed, actually creates a simulation instance for one or more specified nodes by creating communicatively interconnected simulation modules for each of the modules (which may include single or multiple function blocks) associated with each of the specified nodes and by then automatically creating the reference parameter modules for each of the nodes to store the inputs or outputs of those nodes. The third routine 58 may be used to start, stop, reconfigure, capture snapshots, restore of or otherwise control the simulation instance once it is created. Of course, the routines 57 and 58 are integrated with the user display routine 56 to enable a simulation operator to take the different steps in creating, controlling and viewing a simulation instance for the process control system 10.

During operation of the process control system 10 (i.e., after a process control configuration has been created and downloaded to the process control system 10 and, thereby, to each of the different nodes therein), but prior to the creation of any simulation instance, an operator may access the simulation application 50. At that time, the display routine 56 may present a control or simulation display screen 70 to the operator such as that illustrated in FIG. 2. The example simulation display screen 70 of FIG. 2 has a number of different sections, including a node indication section 72 which, in FIG. 2, is on the left hand side of the display screen 70 and an information section 74, which is on the right hand side of the display screen 70.

The node indication section 72 may indicate the nodes and devices, routines, etc. associated with each of the nodes of the process control system 10 and enable a simulation operator to select one or more of those nodes or devices within a node, such as controllers, in any desired manner, such as using a mouse. The node indication section 72 of FIG. 2 illustrates a tree structure that displays the different process control configuration elements as stored in the configuration database 32 for the process 10. Of course, the nodes or other elements of the process control system 10 may be illustrated in any other desired manner. The information section 74, on the other hand, provides the simulation operator with information about the selected element(s) within the node indication section, such as a graphical or textual description of the sub-elements within the elements selected on the node indication section 72. If desired, sets of commands which may be used to generate a simulation instance for one or more nodes of the process control system 10, or to run, control and view a simulation instance of one or more nodes of the process control system 10 may be accessed via drop-down or pop-up menus on the control screen 70. If desired, a slide bar may be provided for specifying the speed of the simulation with respect to the execution speed or cycle of the actual process control system 10. The slide bar may include a stop position and positions that cause the simulation instance to execute slower than or faster than the execution speed of the actual process control system 10. This bar may also include a pause and play or forward button to enable the simulation operator to quickly stop and start the simulation instance.

Figure 2:
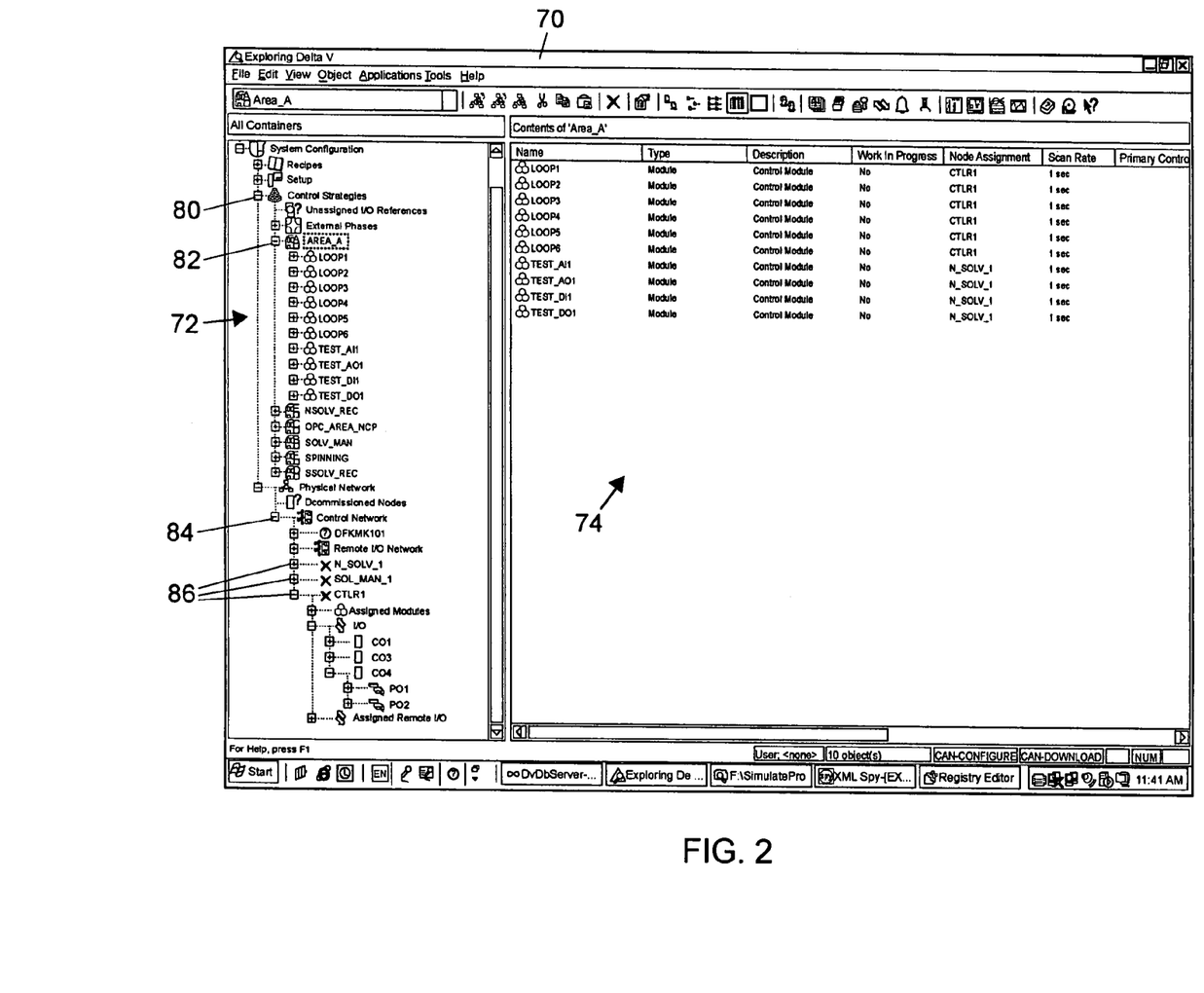
FIG. 2 is a screen display illustrating a simulation creation and control screen for use by a simulation operator.

FIG. 2 specifically illustrates a tree structure in the node indication section 72 having among other things, a control strategy 80 which includes an Area_A associated therewith having a set of modules Loop1-Loop6, Test_AI1, Test_AO1, Test_DI1 and Test_DO1 thereunder. Because the Area_A is selected in FIG. 2, the information section 74 illustrates the different loops and other elements associated with the Area_A, on which subsequent actions will occur as long as Area_A is selected. Similarly, the tree structure of FIG. 2 includes a control network 84 which includes, among other things, three controllers N_Solv_1, Sol_Man_1, and Ctlr1. The Ctlr1 includes Assigned Modules, I/O cards C01, C03, C04 and Assigned Remote I/O. Of course, other entities, modules, etc. are associated with the N_Solv_1 and Sol_Man_1 controllers but are not expanded in the tree structure of FIG. 2.

Generally speaking, the simulation operator at the workstation 20a may use the node indication section 72 on the display screen 70 to select one or more nodes, such as controllers, for which subsequent actions are to occur. Thus, the simulation operator may select one or more nodes (e.g., controllers) for which to create and perform simulation instances. For example, when a simulation operator only selects one node, and then creates a simulation instance via, for example, a drop down menu, the routine 57 discussed above will create a simulation instance for that single node. Similarly, if the simulation operator selects three nodes (such as each of the nodes 12, 14 and 16 of FIG. 1) or the entire process control system on the node indication section 72 of the screen 70, and then selects the create simulation command, the routine 57 creates a simulation instance including the modules within each of those three nodes, or the whole system. In this manner, the simulation operator may easily select the number and specific nodes of the process control system 10 for which to create and implement a simulation instance, thereby enabling a simulation instance to be created for any number of specified nodes at the same time. Furthermore, the simulation operator may select different nodes to view during operation of the simulation instance using the node indication section 72.

When the simulation operator selects the create simulation command, the algorithm or routine 57 operates to convert the process control network, as configured on the specified nodes, into a simulation instance. To perform this function, the create simulation routine 57 accesses the configuration database 32 and copies (or creates) a simulation block for each of the blocks and modules residing in each of the specified nodes as stored in the configuration database 32. The create simulation routine 57 may do so on a node by node basis if so desired. As part of this process, the create simulation routine 57 sends commands to the configuration database 32 to obtain a copy of the modules, function blocks, etc. for a node. The obtained copies are stored in the simulation workstation 20a and preferably are converted to a simulation module by specifying that the simulation input be used for input blocks.

While the simulation modules blocks are created on a node by node basis in the simulation workstation 20a, they are communicatively coupled together by communication links as specified in the actual control modules. However, the create simulation routine 57, as part of this creation process, automatically identifies the inputs and outputs of each of the control blocks that are outside of the specified nodes using, for example, path names associated with the actual inputs and outputs. To perform this function, the create simulation routine 57 may compare the path name or other indication of the source or destination of the input and output of the created simulation block with the node path names of the simulated nodes to determine if the input or output source resides within or outside of the specified nodes (i.e., the nodes for which the simulation is being created). If the source or destination of the communication signal resides outside of the specified nodes, the create simulation routine 57 automatically creates a link to a reference parameter module (which is created by the routine 57) within the simulation system to operate as the input or output and stores that module in the simulation system, such as in the simulation workstation 20. As will be understood, this reference parameter module is used to provide a link or destination for certain inputs and outputs for the simulation instance that do not exist in reality in the simulation system, such as links to field devices, etc.

Figure 3:
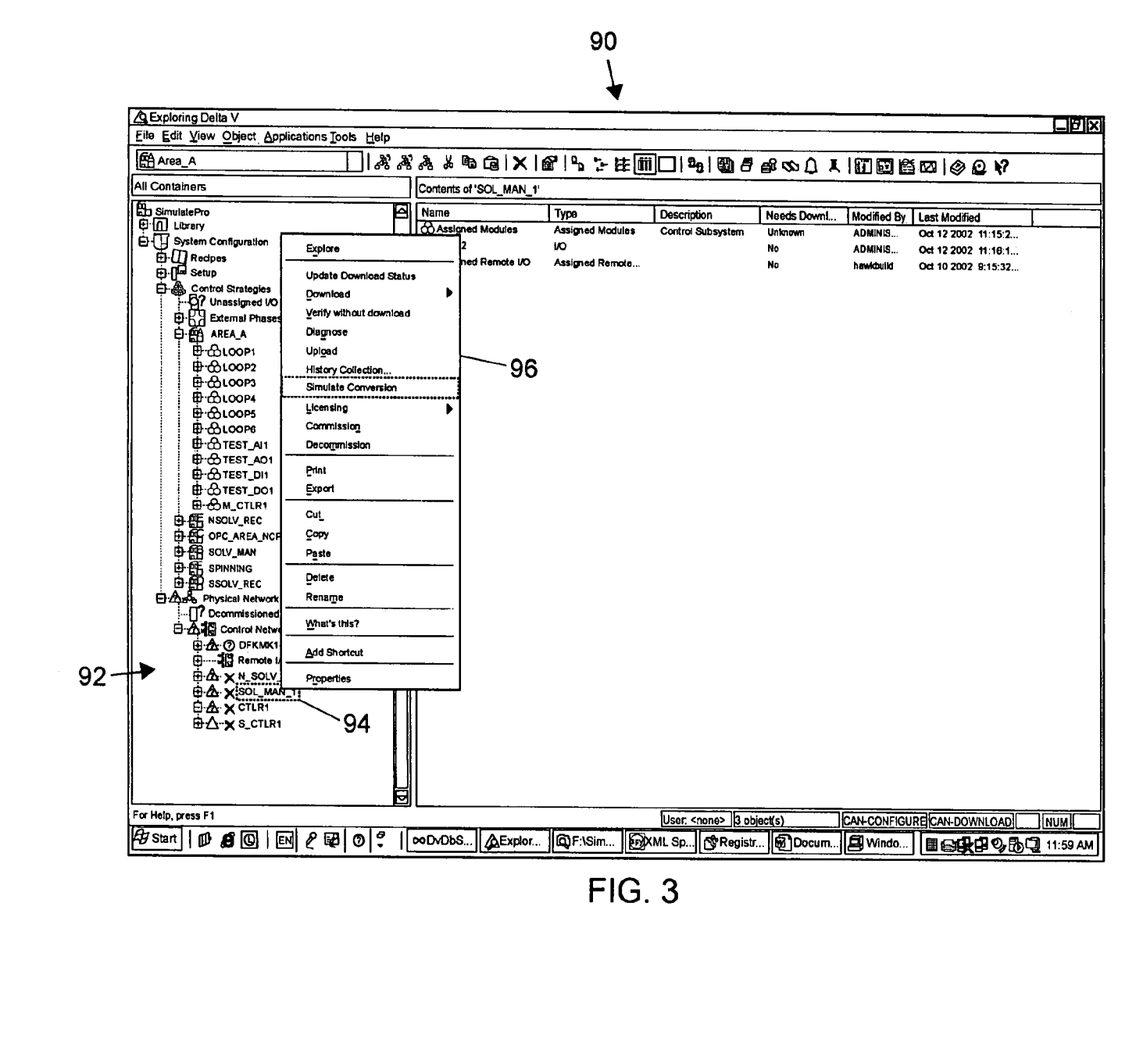
FIG. 3 is a screen display illustrating a command to create a simulation for a single controller node for a process control system.

FIG. 3 illustrates a screen display 90 including the tree structure 92 in which a single controller node 94 (named Sol_Man_1) has been selected. The simulation operator has called up a pop-up menu 96 (by, for example, right clicking the selected controller 94 with the mouse) to access a "Simulate Conversion" command. The right hand side of the display 90 illustrates the modules within the selected controller 94. Selecting the Simulate Conversion command in the window 96 calls the application 57 which then creates a simulation for the selected controller node 94 as described above.

Figure 4:
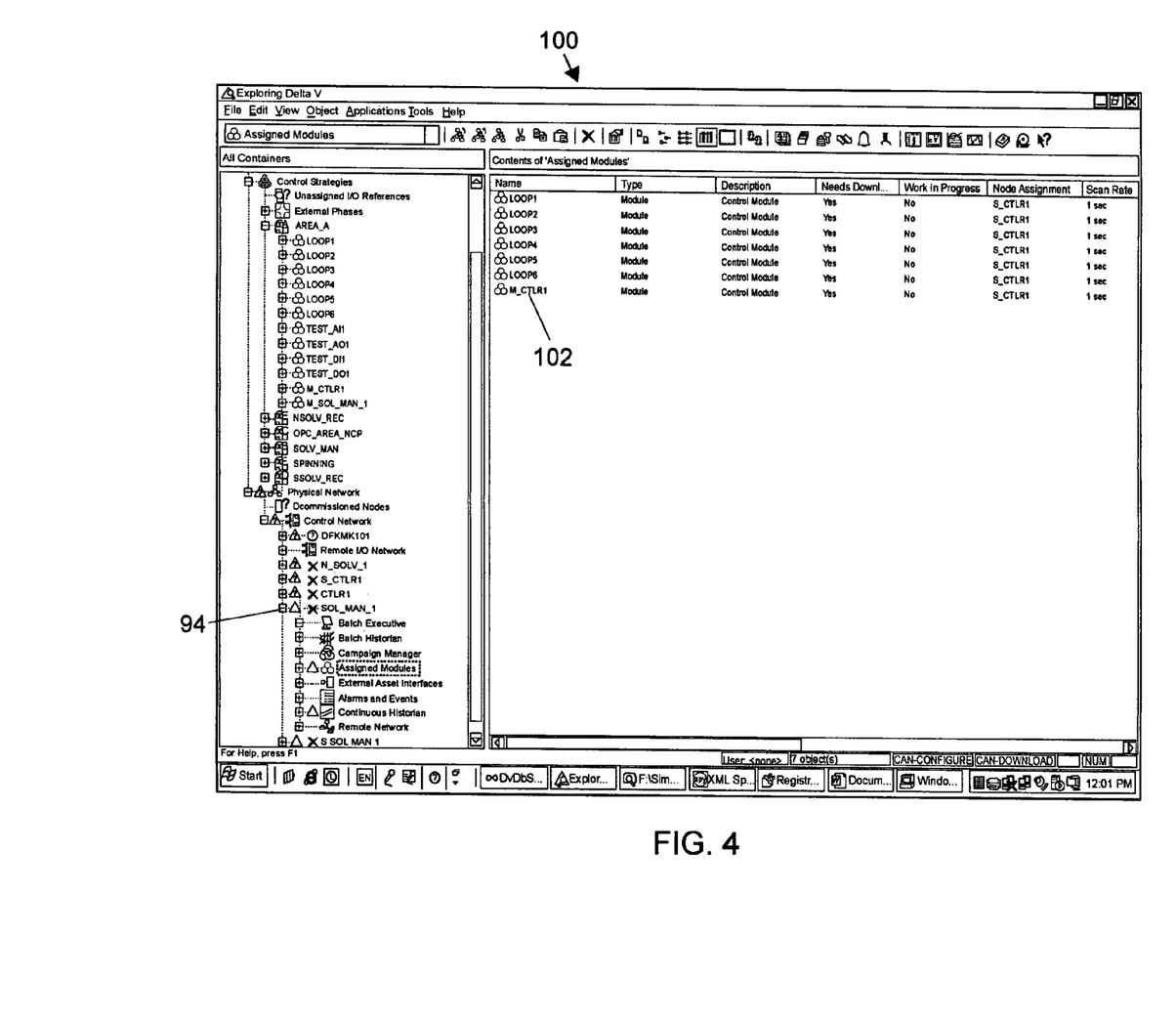
FIG. 4 is a screen display illustrating a simulation created for a single controller node of a process control system.

In particular, the routine 57 creates the simulation modules or blocks for each of the control modules within the specified node 94 along with a reference parameter module for storing inputs and outputs to the node. Such a simulation instance is illustrated in FIG. 4, which depicts a screen 100 showing the modules within the simulation instance for the selected controller 94 after creation of the simulation instance. As illustrated on the right hand side of the screen 100, the simulation instance for the controller node 94 includes simulation modules Loop1-Loop6 (which are created from the actual modules Loop1-Loop6 of the node 94 as stored in the configuration database 32). However, as part of the conversion process, the application 57 has created an additional module 102 (named M_Ctlr1) which is used as a container module that holds input and output references for the controller node 94. As noted above, after creating the simulated control blocks and modules for a node, the routine 57 determines the existence of any inputs/outputs which are external to the created simulation modules, such as references to blocks or signals from field devices or modules within other nodes that are not included within the simulation instance. Upon detecting such input/output references, the routine 57 automatically creates a reference module, such as the module 102, for those references, thereby creating a module within the simulation system that is responsible for providing or accepting input/outputs of the simulation instance for signals being sent to or being received from hardware, such as field devices, which are not part of the simulation.

Figure 5:
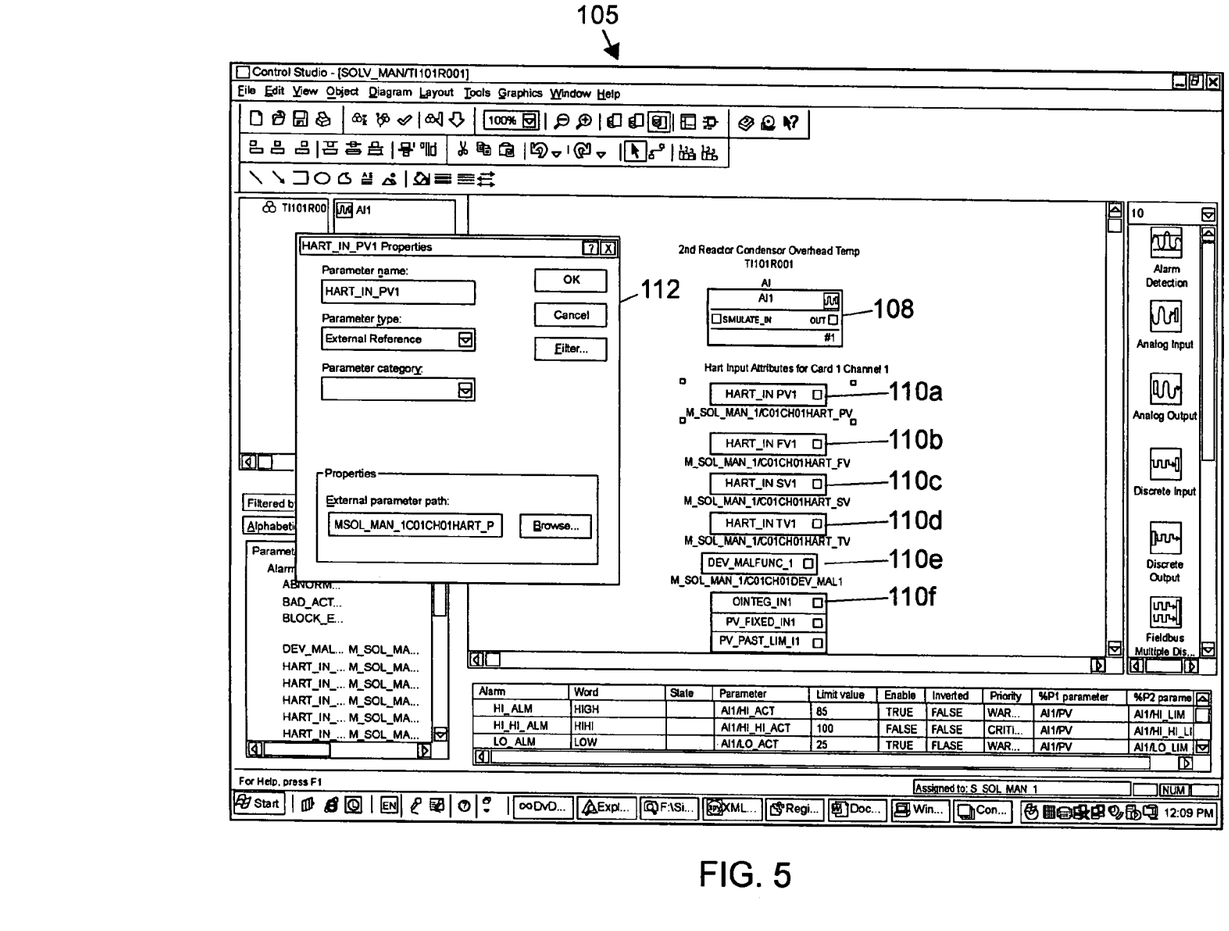
FIG. 5 is a screen display illustrating a set of external reference parameters converted to a module reference within the simulation.
Figure 6:
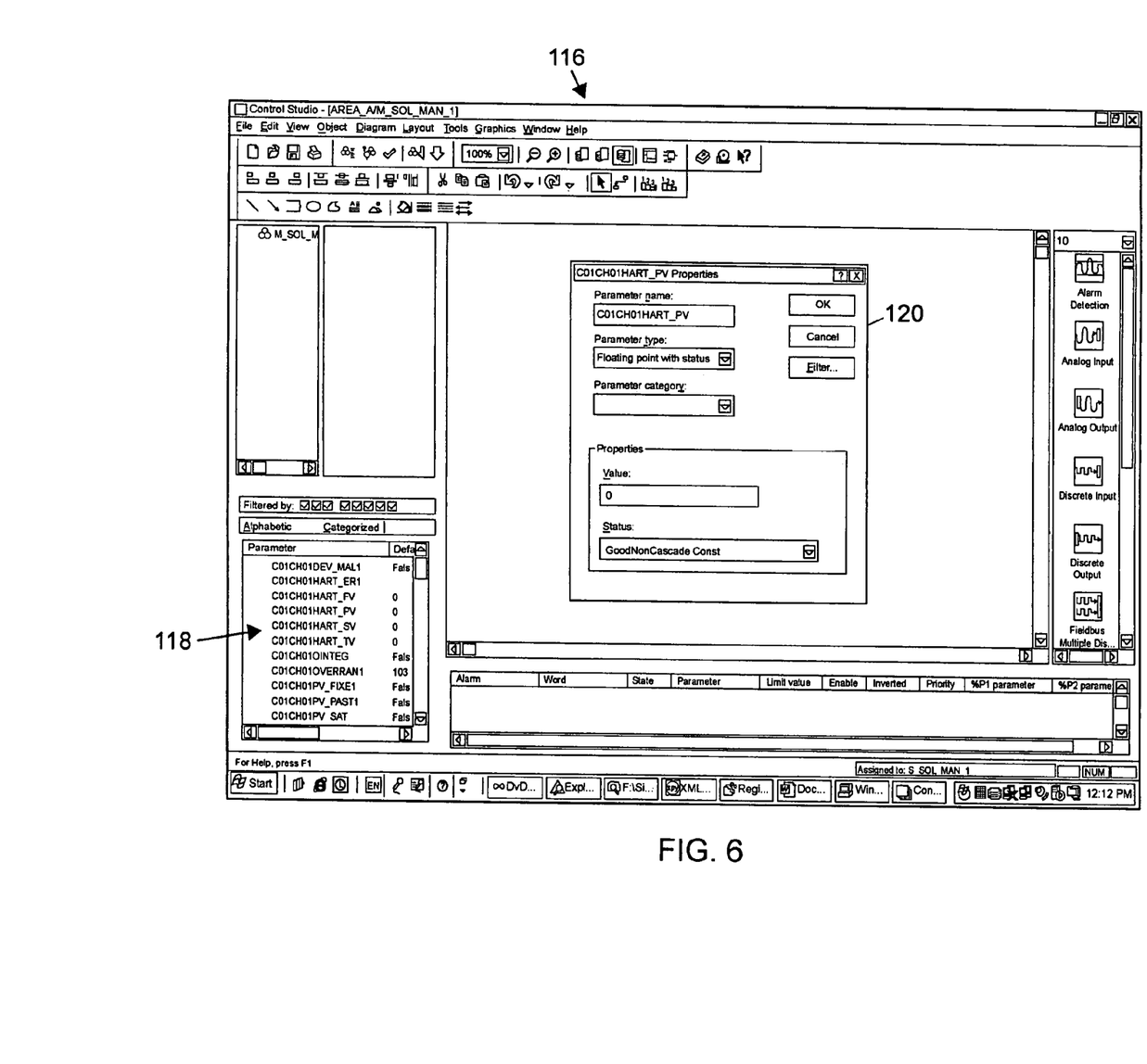
FIG. 6 is a screen display illustrating a container or reference parameter module created to hold input/output references for the created simulation.

FIG. 5 depicts a screen display 105 illustrating a converted function block 108 (having a simulated input) and a set of external references 110a-110f each specifying a HART device input or output (and thus an external reference) which points, in fact, to an external reference module created for the node to hold these external references. The reference box 110a has been selected and the properties thereof are illustrated in the pop-up window 112, which specifies the path name for this reference to be the module C01CH01HART_PV in the M_Sol_Man_1 controller node (which is the simulated node). Similarly, FIG. 6 depicts a screen display 116 illustrating the C01CH01HART_PV module as including a set of external reference parameters named in the menu box 118. The properties of a selected one of these external reference parameters (i.e., the HART_PV parameters), are illustrated in a pop-up window 120. Of course, similar properties are stored for each of the other reference parameters associated with or stored within the reference parameter module 102 of FIG. 4.

Thus, as will be understood, the application 57 creates, as part of the simulation conversion, an external reference parameter module that stores the values and other attributes of the external references associated with each simulation block. While the application 57 described herein creates a single external reference module for each specified controller node, external reference parameter modules could hold more or less external references if so desired. Thus, for example, an external reference parameter module could be created for each external reference, etc. This operation also prevents the simulation operator from having to manually specify or create external references for the simulation system, which in the past was time consuming and fraught with error. Still further, the creation of these modules makes it easier to run a simulation, as inputs to and outputs from the simulation instance may be handled via these external reference modules which are easy to access and change due their object oriented nature.

While it is a fairly straightforward matter for the create simulation routine 57 to recognize and copy control blocks and other modules associated with a controller node, there are cases in which some of the control or other function blocks or modules of a node may be stored in and run outside of the controller for that node. For example, Fieldbus field devices are capable of storing and executing control blocks and other modules associated with a node of the process control system. In these cases, the create simulation routine 57 may first recognize the existence of control blocks or other modules within the node but outside of the controller by looking for such blocks in configuration scheme as stored in the configuration database 32. While the application 57 described herein specifically looks for Fieldbus function blocks, it is possible that other types of function blocks exist that are capable of operating external to the controller of a node and the application 57 could look for these types of blocks as well. Of course, the manner of performing these searches will be dependent on the type of programming and documentation used within the controller of the node.

Upon recognizing the existence of function blocks or modules associated with the node but outside of the controller for that node, the create simulation routine 57 may copy that block or create a new block that mimics that block in the simulation workstation 20a. For example, to copy the block, the create simulation application 57 may access the block from the configuration database or from the field device actually storing the block. If the function block within the field device or other device is not in the same protocol as the controller blocks used in the simulation, as will generally be the case, then the application 57 may create a simulation block in the controller protocol that best mimics the functionality of the function block within the field device. This function may be performed with or without the aid of a simulation operator who may be queried to specify the controller protocol block to use for the function block in the field device. Alternatively, a table or list specifying the conversion between blocks of the different protocols, including the parameter conversions, may be stored and used to create a function block within the controller protocol that mimics the operation of the actual function block within the field device.

After creating a function block within the controller protocol for the external function block, e.g., the Fieldbus function block, the create simulation routine 57 may then convert that function block to a simulation block in the same manner as performed with the controller protocol blocks or modules.

Another problem that arises in current simulations is the problem of dealing with input/output error indications from sources, such as input and output function blocks, that are no longer tied to an actual device or source within the control system, such as a field device, or that do not have a simulation mode and which, therefore, appear to provide bad or stale data or which result in diagnostic errors. In some cases, the blocks or sources producing these signals are not set to simulate and, therefore, the signals from these blocks lead to the generation of bad I/O messages. Still further, the creation of the simulation instance with reference parameters for the inputs and outputs leads to a situation in which I/O failures may be detected by the simulation control modules or blocks even though no such I/O failures actually exist (because no true I/O is taking place). Depending on the amount of data send to and from these blocks in the simulation, numerous error messages may be detected during operation of the simulation instance and may be sent to the simulation operator as input/output or diagnostic error indications. These false error messages can become distracting and tedious to deal with during the simulation.

To alleviate this problem, the create simulation application 57 makes changes to the manner in which input/output signals are handled in the simulation instance as opposed to the actual process control system. In particular, the create simulation application 57 disables the indication or detection of Bad I/O in, for example, analog output (AO) and digital or discrete output (DO) blocks and in external parameters that directly reference I/O channels, such as those in the external reference parameter modules discussed above. To perform this operation, the create simulation application 57 may intentionally disable the status indication of these I/O signals by, for example, failing to set the bits for I/O error detection or simulate if the output module is assigned to run in the simulation workstation 20a. When these status or error indications are not enabled, then the simulation operator interface will appear as though the I/O is normal, which will allow the simulation operator training to be performed without the distraction of false bad I/O indications. Of course, the create simulation routine 57 may operate, during the conversion process, to disable the I/O error detection from any other blocks or sources that, within the simulation system, are expected to have bad or stale I/O data because these sources of data are not tied to actual operating devices, such as field devices.

After a simulation instance has been created for one or more of the nodes, this simulation instance may be implemented in the simulation workstation 20a for training or testing purposes. In some cases, the simulation instance may be tied, via the references created for the inputs/outputs of each of the nodes, to a standard simulation interface, such as a HYSIS interface using any known technique, such as OPC. Of course, if desired, the create simulation routine 57 may provide its own interface such as an API (application programming interface) enabling the simulation operator to specify or change inputs and outputs to the simulation instance in any desired manner.

As will be understood, the commands for initialization, and the control of the speed of the simulation instance, as well as for the view of the information within the simulation instance, may be performed through a single interface using single commands, even though more than one node is effected. This view enables a simulation operator to issue a single request that addresses all nodes involved in the simulation. The view can be effected or changed by selecting different nodes via the node indication section of the display screen.

There is often a requirement in large training systems to provide the capability to restart the process control simulation at a previous time in the training session. There may also be a requirement to replay the operator actions taken in the simulation starting from a previous point in time. These functions can be performed by the application 58 which can be initiated, for example, via a drop down menu on the display 70 of FIG. 2.

In the past, capturing a snapshot of a running simulation has been a somewhat difficult, as it generally required providing a request to copy each of the desired parameters from the different function blocks or modules within the simulation instance. However, because these requests must be sent individually to different modules, and take a finite amount of time to execute, it is practically impossible to copy the state of all of the modules of the simulation system at the same instance without stopping the simulation for an extended period of time to allow this copying to occur. In large simulation systems with many control modules therein, this copying process can result in a significant delay, leading to noticeable disruption in the simulation.

To speed up the process of capturing a snapshot, it has been discovered that it is possible to use the redundant capabilities of the modules within the simulation system. In particular, as is known, many control modules, such as the control modules and blocks executed in the controllers 12a, 14a and 16a of FIG. 1 include redundant capabilities. More specifically, these control modules are generally created to periodically or on a change by change basis, send values of the parameters, etc. of the module to redundant control modules located in the redundant controllers 12R, 14R and 16R. The redundant control modules update themselves in such a manner that the redundant controllers 12R, 14R and 16R are available at any time to take over primary operation of the process control system upon failure of a respective one of the controllers 12a, 14a or 16a.

The create simulation application 57 can, during the process of creating simulation modules for the simulation instance, tie each of the redundant signals generated by the simulation module to a redundant module or to a specific memory address within the simulation computer 20a and cause those signals to be written to and saved in a known memory location. Thus, instead of creating a redundant control module for each of the modules within the simulation instance, the create simulation application 57 needs only to tie the redundant signals generated by the simulation modules to specific and dedicated memory locations, which may or may not be memory locations within a separate module. During operation of the simulation system, the redundant signals created in the normal course of the simulation modules are then captured and the data within these signals is stored in any logical manner in an easy accessible memory for later retrieval. Thereafter, at any time during operation of the simulation instance, the application 58 may create a snapshot of the operating simulation by copying the redundant data stored in this logical manner into a buffer or file assessable to the operator. Because the memory locations for the redundant data are dedicated and in easily assessable memory, the copying process, which can be a block copy, can be performed quickly, which speeds up the time it takes to capture a snapshot of the simulation system as compared with copying the data as stored in the different modules of the actual simulation instance. Thus, when creating a snapshot for a particular time, the routine 58 needs only to halt the operation of the simulation system at the particular time, copy the contents of the dedicated memory locations into a snapshot file, which can generally be done very quickly and then continue operation of the simulation system.

Figure 7:
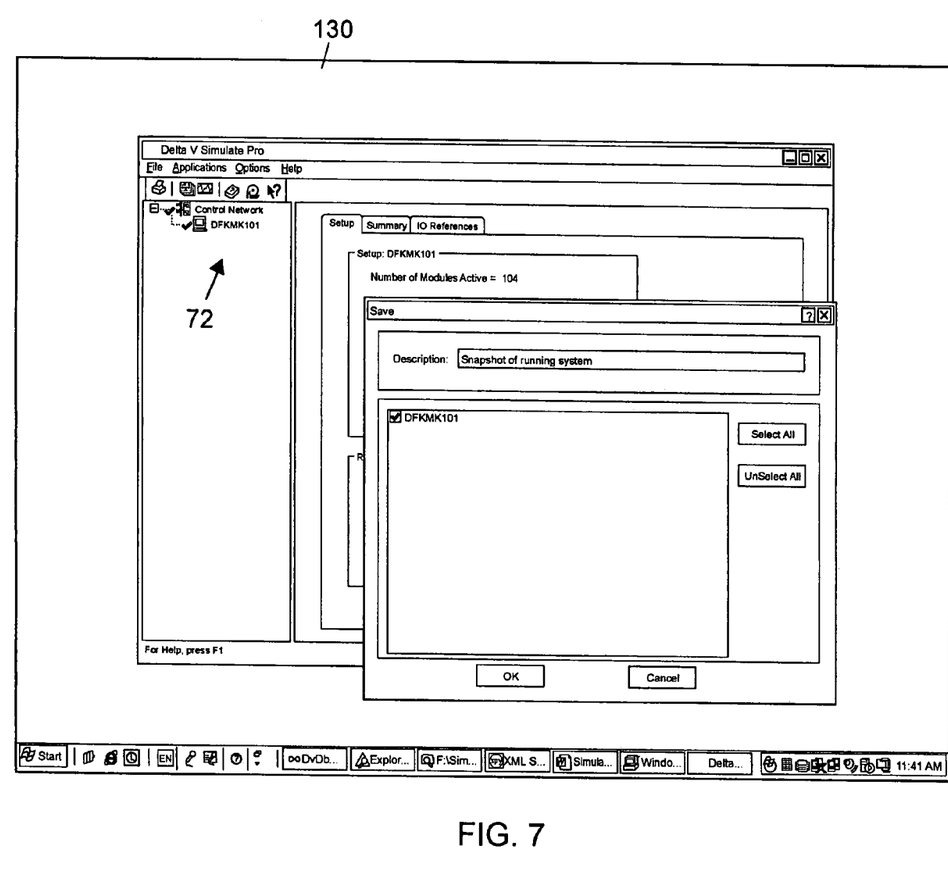
FIG. 7 is a screen display illustrating a snapshot capture screen for use by a simulation operator in capturing a snapshot of the simulation system.

FIG. 7 illustrates a screen display 130 that may be used by the simulation operator to initiate the capturing of a snapshot of the simulation system at a particular time. As illustrated, the simulation operator may save a snapshot of the system within a selected node, as specified by the node indication section 72, and may name that snapshot for future reference. Of course, this snapshot may be captured on a node by node basis for any node having the proper redundant capabilities. If desired, the snapshot collection application 58 may instruct each of the nodes of the process control system to capture a snapshot at the same time, so that a multi-node snapshot is obtained.

Figure 8:
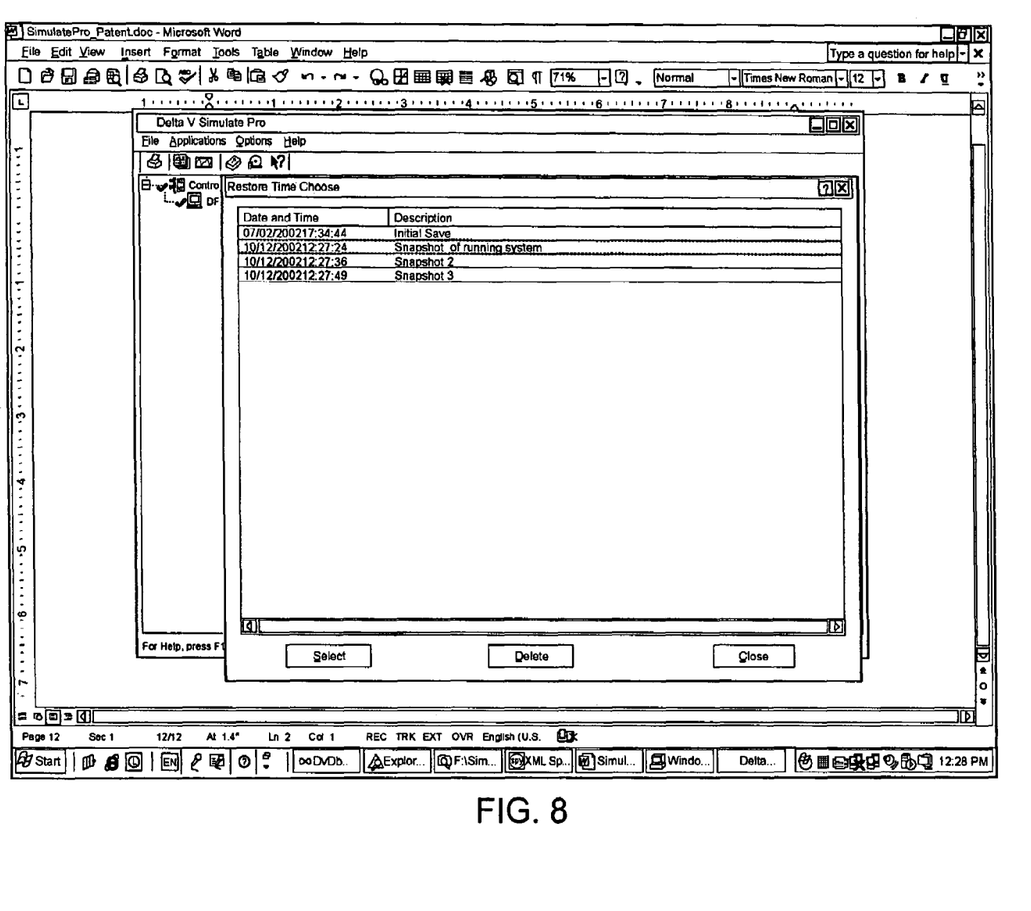
FIG. 8 is a screen display illustrating a restoration screen for use by a simulation operator in restoring the simulation system to a previously captured snapshot.

Similarly, as illustrated in FIG. 8, the simulation operator may restore the simulation system to a previous setting as captured in a saved snapshot by initiating a restore application (which is part of the routine 58) and selecting one of the previous snapshots of the system which to restore. Of course, the restore file selected by the simulation operator will generally be the file that was previously saved as a snapshot and the restore application will take that data in the restore file and write it to the simulation modules in any standard or known manner. During this operation, the routine 58 will halt the operation of the simulation system, access the snapshot file specified by the simulation operator, copy the contents of the snapshot file into the communicatively interconnected simulation modules, and then continue operation of the simulation system.

While processing the request to save or restore the simulation, the execution of the simulation modules on the associated simulation stop. For this reason, the save and restore should be done with minimal delay. If desired, the commands associated with save and restore may be passed to a node from an application/training station using OPC. In this case, the associated application is responsible for issuing the save and restore commands to each node of interest. Preferably, when a save command is initiated, the simulation control application 58 will provide a dialog on the display that allows the simulation operator to specify nodes that will be saved. Also, the simulation operator may provide a description that will be saved with the data file(s). Likewise, when a restore command is initiated, the simulation control application 58 will present a list of times for which snapshot files have been created and an associated description. When a particular time is selected, then the simulation operator may select which nodes are to be restored using the saved data.

If desired, the simulation control application 58 supports an option that allows the save command to automatically and periodically be issued to all nodes. To initiate automatic saves, the simulation operator would need to enable this feature and specify the frequency of saves and the description to be included with the file. The dialog for this feature may be modeled after the MicroSoft™ Word auto save Tools Option. As a result of the operation of this feature, the simulation control application 58 will periodically issue a capture and save command to the nodes of the simulation instance. To avoid disrupting a training session, processing of the save command should cause the execution of the simulation modules to stop so that the command may be acted upon without delay.

When implemented, any of the software described herein may be stored in any computer readable memory such as on a magnetic disk, a laser disk, or other storage medium, in a RAM or ROM of a computer or processor, etc. Likewise, this software may be delivered to a user, a process control system or an operator workstation using any known or desired delivery method including, for example, on a computer readable disk or other transportable computer storage mechanism or over a communication channel such as a telephone line, the Internet, the World Wide Web, any other local area network or wide area network, etc. (which delivery is viewed as being the same as or interchangeable with providing such software via a transportable storage medium). Furthermore, this software may be provided directly without modulation or may be modulated using any suitable modulation carrier wave before being transmitted over a communication channel.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A method of creating a simulation system for simulating the operation of one or more nodes of a process control system having a plurality communicatively interconnected modules at each of the one or more nodes and a configuration for each of the one or more nodes stored in a configuration database, the configuration for each of the one or more nodes defining a set of modules to be executed on one or more computer devices within a node and communication connections between the modules, wherein each of the modules when executed at the node performs a process control related function, the method comprising;
specifying at least one node of the process control system for which to create a simulation instance;
accessing the configuration database to obtain copies of the modules within the configuration of the at least one specified node of the process control system;
storing the copies of the modules within a simulation computer; and
automatically converting the copied modules into simulation modules to create the simulation instance having a plurality of communicatively interconnected simulation modules.

2. The method of creating a simulation system of claim 1, wherein at least one of the copied modules is in a controller protocol and further including determining from the configuration database, the existence of a second module using a different protocol than the controller protocol, creating a second simulation module in the controller protocol for the second module and communicatively interconnecting second simulation module with the interconnected simulation modules.

3. The method of creating a simulation system of claim 2, wherein the second module is a function block.

4. The method of creating a simulation system of claim 2, wherein determining includes determining the existence of a Fieldbus module.

5. The method of creating a simulation system of claim 2, wherein creating a second simulation module includes using a list that specifies a conversion between a particular module within the different protocol and a particular module within the controller protocol.

6. The method of creating a simulation system of claim 5, wherein using a list includes using a list that specifies parameter conversions between the particular module within the different protocol and the particular module within the controller protocol.

7. The method of creating a simulation system of claim 2, wherein at least one of the copied modules includes an external reference parameter and further including creating an external reference parameter module to store the external reference parameter in the simulation computer.

8. The method of creating a simulation system of claim 7, wherein creating the external reference parameter module includes creating a single external reference parameter module to hold multiple external reference parameters for one of the specified nodes.

9. The method of creating a simulation system of claim 7, wherein creating the external reference parameter module includes creating a single external reference parameter module to hold all of the external reference parameters for one of the specified nodes.

10. The method of creating a simulation system of claim 1, wherein at least one of the copied modules includes an external reference parameter and further including creating an external reference parameter module to store the external reference parameter in the simulation computer.

11. The method of creating a simulation system of claim 10, wherein creating the external reference parameter module includes creating a single external reference parameter module to hold multiple external reference parameters for one of the specified nodes.

12. The method of creating a simulation system of claim 10, wherein creating the external reference parameter module includes creating a single external reference parameter module to hold all of the external reference parameters for one of the specified nodes.

13. The method of creating a simulation system of claim 1, further including disabling an input or output status indication associated with at least one of the simulation modules.

14. The method of creating a simulation system of claim 13, wherein disabling includes disabling the input or output status indication associated with an output function block.

15. The method of creating a simulation system of claim 13, wherein disabling includes disabling the input or output status indication associated with an input function block.

16. The method of creating a simulation system of claim 1, wherein the modules within the process control system include redundancy capabilities and further including creating the simulation modules to include redundancy capabilities and using the redundancy capabilities of the simulation modules to capture a snapshot of the simulation system during execution of the simulation system.

17. The method of creating a simulation system of claim 16, wherein using the redundancy capabilities of the simulation modules includes tying redundancy signals created by the simulation modules to particular memory locations within the simulation computer and copying the contents of the particular memory locations within the simulation computer to a snapshot file to obtain a snapshot of the simulation system.

18. A method of obtaining a snapshot of a simulation system for a process control system having modules with redundancy capabilities that create redundancy signals to be sent to redundant modules within the process control system, wherein each of the modules performs one or more control or communication functions, the method comprising:
creating a simulation system as a plurality of communicatively interconnected simulation modules which create redundancy signals for parameters thereof;
sending the redundancy signals of the communicatively interconnected simulation modules within the simulation system to be stored in dedicated memory locations in a simulation computer during operation of the simulation system; and
storing a snapshot of the simulation system at a particular time by:
halting operation of the simulation system at the particular time;
copying the contents of the dedicated memory locations into a snapshot file; and
continuing operation of the simulation system.

19. The method of obtaining a snapshot of a simulation system of claim 18, further including restoring the simulation system to a previous condition by halting operation of the simulation system, accessing the snapshot file, copying the contents of the snapshot file into the communicatively interconnected simulation modules, and then continuing operation of the simulation system.

20. The method of obtaining a snapshot of a simulation system of claim 18, including automatically and periodically performing the steps associated with storing a snapshot of the simulation system during operation of the simulation system.

21. A simulation creation system for creating a simulation instance to simulate the operation of one or more nodes of a process control system having a plurality communicatively interconnected modules at each of the one or more nodes and a configuration for each of the one or more nodes stored in a configuration database, the configuration for each of the one or more nodes defining a set of modules to be executed on one or more computer devices within a node and communication connections between the modules, wherein each of the modules when executed at the node performs a process control related function, the simulation creation system comprising;
a processor;
a computer readable memory;
a first routine stored on the computer readable memory to be executed on the processor to enable a user to specify at least one node of the process control system for which to create a simulation instance; and
a second routine stored on the computer readable memory to be executed on the processor to create a simulation instance for the specified node by;
accessing the configuration database to obtain copies of the modules within the configuration of the specified node;
storing the copies of the modules within a simulation memory; and
automatically converting the copied modules into simulation modules to create the simulation instance having a plurality of communicatively interconnected simulation modules.

22. The simulation creation system of claim 21, wherein at least one of the copied modules is in a controller protocol and wherein the second routine determines from the configuration database, the existence of a second module using a different protocol than the controller protocol, creates a second simulation module in the controller protocol for the second module and communicatively interconnects the second simulation module with the communicatively interconnected simulation modules.

23. The simulation creation system of claim 22, further including a list stored on the computer readable memory that specifies a conversion between a particular module within the different protocol and a particular module within the controller protocol and wherein the second routine uses the list to create the second simulation module in the controller protocol.

24. The simulation creation system of claim 23, wherein the list further specifies parameter conversions between the particular module within the different protocol and the particular module within the controller protocol.

25. The simulation creation system of claim 21, wherein at least one of the copied modules includes an external reference parameter and wherein the second routine creates an external reference parameter module to store the external reference parameter in the computer readable memory.

26. The simulation creation system of claim 25, wherein the second routine creates a single external reference parameter module to hold all of the external reference parameters for one of the specified nodes.

27. The simulation creation system of claim 21, wherein the second routine disables an input or output status indication on at least one of the simulation modules.

28. The simulation creation system of claim 27, wherein the second routine disables the input or output status indication on an input function block.

29. The simulation creation system of claim 21, wherein the modules within the process control system include redundancy capabilities and wherein the second routine creates the simulation modules to include redundancy capabilities and further including a third routine stored on the computer readable memory to be executed on the processor to use the redundancy capabilities of the simulation modules to capture a snapshot of the simulation system during execution of the simulation system.

30. The simulation creation system of claim 29, wherein the second routine ties the redundancy signals created by the simulation modules to particular memory locations within the simulation memory and the third routine copies the contents of the particular memory locations within the simulation memory to a snapshot file to obtain a snapshot of the simulation system.

* * * * *